(12) United States Patent  (10) Patent No.: US 8,194,996 B2
Hasegawa  (45) Date of Patent: Jun. 5, 2012

(54) IMAGE PROCESSING APPARATUS, IMAGE PROCESSING METHOD, IMAGE PROCESSING PROGRAM, AND IMAGE CAPTURING APPARATUS

(75) Inventor: Yuichi Hasegawa, Tokyo (JP)

(73) Assignee: Sony Corporation (JP)

( * ) Notice: Subject to any disclaimer, the term of this patent is extended or adjusted under 35 U.S.C. 154(b) by 929 days.

(21) Appl. No.: 12/284,071

(22) Filed: Sep. 18, 2008

(65) Prior Publication Data

US 2009/0080790 A1 Mar. 26, 2009

(30) Foreign Application Priority Data

Sep. 21, 2007 (JP) ................... P2007-244825

(51) Int. Cl.
*G06K 9/40* (2006.01)
(52) U.S. Cl. ............... 382/260; 382/255; 348/208.4
(58) Field of Classification Search .............. None
See application file for complete search history.

(56) References Cited

U.S. PATENT DOCUMENTS

| | | | |
|---|---|---|---|
| 7,990,429 B2 * | 8/2011 | Saito ............... | 348/222.1 |
| 2006/0146168 A1 * | 7/2006 | Nishi et al. ............ | 348/333.01 |
| 2008/0137978 A1 * | 6/2008 | Fu ............... | 382/255 |

FOREIGN PATENT DOCUMENTS

| | | | |
|---|---|---|---|
| JP | 2001-036737 A | | 2/2001 |
| JP | 2007-206738 A | | 8/2007 |
| WO | WO2007049634 | * | 5/2007 |

OTHER PUBLICATIONS

A. Murat Tekalp, Howard Kaufman, and John W. Woods, "Identification of Image and Blur Parameters for the Restoration of Noncausal Blurs", Aug. 1986, IEEE Transactions on Acoustics, Speech, and Signal Processing, vol. ASSP-34, No. 4, pp. 963-972.*
Lu Yuan, Jian Sun, Long Quan, and Heung-Yeung Shum, "Image Deblurring with Blurred/Noisy Image Pairs", Jul. 2007, ACM Transaction on Graphics, vol. 26, No. 3, Article 1, pp. 1-10.*

* cited by examiner

*Primary Examiner* — Jason M Repko
*Assistant Examiner* — Siamak Harandi
(74) *Attorney, Agent, or Firm* — Lerner, David, Littenberg, Krumholz & Mentlik, LLP

(57) ABSTRACT

An image processing apparatus for correcting an input image for blur using a recovery filter in accordance with image blurriness includes a blurriness determining unit that receives a target image to be corrected, applies to the target image a recovery filter including a degree-of-blur parameter corresponding to blurriness while changing a value of the degree-of-blur parameter, evaluates a degree of recovery of each of corrected target images which have been corrected with recovery filters having different degree-of-blur parameter values, and determines blurriness of the target image based on the degree-of-blur parameter value of the highly evaluated recovery filter; and a blur correction unit that sets a recovery filter for the target image based on the degree-of-blur parameter in accordance with the determined blurriness of the target image and corrects the target image for blur using the recovery filter.

10 Claims, 9 Drawing Sheets

FIG. 4A h(x,y)

| | | |
|---|---|---|
| 0.0016 | 0.0371 | 0.0016 |
| 0.0371 | 0.8450 | 0.0371 |
| 0.0016 | 0.0371 | 0.0016 |

FIG. 4B h(x,y)

| | | | | |
|---|---|---|---|---|
| 0.0000 | 0.0000 | 0.0002 | 0.0000 | 0.0000 |
| 0.0000 | 0.01113 | 0.0837 | 0.0113 | 0.0000 |
| 0.0002 | 0.0837 | 0.6187 | 0.0837 | 0.0002 |
| 0.0000 | 0.0113 | 0.0837 | 0.0113 | 0.0000 |
| 0.0000 | 0.0000 | 0.0002 | 0.0000 | 0.0000 |

FIG. 4C hw(x,y)

| | | | | |
|---|---|---|---|---|
| −0.0003 | −0.0001 | 0.0177 | −0.0001 | −0.0003 |
| −0.0001 | 0.0139 | −0.1901 | 0.0139 | −0.0001 |
| 0.0177 | −0.1901 | 1.6358 | −0.1901 | 0.0177 |
| −0.0001 | 0.0139 | −0.1901 | 0.0139 | −0.0001 |
| −0.0003 | −0.0001 | 0.0177 | −0.0001 | −0.0003 |

IMAGE PROCESSING APPARATUS, IMAGE PROCESSING METHOD, IMAGE PROCESSING PROGRAM, AND IMAGE CAPTURING APPARATUS

CROSS REFERENCES TO RELATED APPLICATIONS

The present application claims priority from Japanese Patent Application JP No. 2007-244825 filed in the Japanese Patent Office on Sep. 21, 2007, the entire content of which is incorporated herein by reference.

BACKGROUND OF THE INVENTION

1. Field of the Invention

The present invention relates to an image processing apparatus, an image processing method, an image processing program, and an image capturing apparatus, and more particularly, to an image processing apparatus, an image processing method, an image processing program, and an image capturing apparatus for correcting an input image for blur using a recovery filter in accordance with blurriness of the image.

2. Description of the Related Art

Photographs taken by image capturing apparatuses are frequently out of focus or blurred, which are called blurry photographs. Such blurry photographs can be corrected for blur including out-of-focus blur using dedicated photo retouch software installed in a personal computer or the like and transformed into favorable images.

In a correction operation using photo retouch software of the related art, a target image is read into a personal computer. When an image capturing apparatus is a digital camera, the image capturing apparatus can transfer captured image data to the personal computer. Subsequently, a user sets various image-correcting parameters and applies a correction filter including the set various parameters to the target image. The photo retouch software generates a correction filter on the basis of the set various parameters, applies the correction filter to the target image to generate a corrected image, and displays the corrected image on an image display apparatus or the like. Looking at the image displayed on the image display apparatus, the user adjusts the parameters by try and error until a desired image is obtained. The target image may be, besides an image captured with the image capturing apparatus, an image read with an image reading apparatus or an image obtained via a network. Besides personal computers, more and more models of image reading apparatuses such as scanners and photo-printers now have the blur correction function.

Besides software-based correction processing, a proposal has been made in, for example, Japanese Unexamined Patent Application Publication No. 2001-36737 (see FIG. 2) to dispose a correction circuit on a photo processing apparatus so that special correction including blur correction can be performed using hardware.

SUMMARY OF THE INVENTION

Correction processing using photo retouch software of the related art is not easy to use for general users.

In general, digital cameras have the display function of displaying a captured image on a main body thereof. With this function, a user can immediately check a captured image. In contrast, a correction operation using the photo retouch software is executable only after an image is read into a personal computer or the like. Therefore, the operation is complicated and fails to correct a captured image on the spot. In particular, when the user is away from home in order to capture images or the like, the user can correct captured images only after the user comes home, which is inconvenient for the user.

Various parameters used in correction are necessary to be adjusted by the user. However, the adjustment of the parameters is very difficult for general users. It may take time to obtain a desired image, or a desired image may not be obtained.

It is desirable to provide an image processing apparatus, an image processing method, an image processing program, and an image capturing apparatus for simply correcting an image for blur without placing a special load on a user.

According to an embodiment of the present invention, there is provided an image processing apparatus for correcting an input image for blur using a recovery filter in accordance with blurriness of the image. The image processing apparatus includes blurriness determining means for determining blurriness of a target image and blur correction means for correcting the target image for blur on the basis of a determination result.

The blurriness determining means receives a target image to be corrected, applies to the target image a recovery filter including a degree-of-blur parameter corresponding to blurriness of the image while changing a value of the degree-of-blur parameter. Then, the blurriness determining means evaluates a degree of recovery of each of corrected target images which have been corrected by using recovery filters having different values of the degree-of-blur parameter, and determines blurriness of the target image on the basis of the value of the degree-of-blur parameter of the recovery filter which has been highly evaluated. The blur correction means sets a recovery filter for the target image on the basis of the degree-of-blur parameter in accordance with the determined blurriness of the target image. Then, the blur correction means corrects the target image for blur using the recovery filter for the target image.

According to the image processing apparatus, the blurriness determining means applies to a target image a recovery filter including a degree-of-blur parameter corresponding to blurriness of the image while changing a value of the degree-of-blur parameter. Then, the blurriness determining means evaluates a degree of recovery of each of corrected target images which have been corrected by using recovery filters, and determines blurriness of the target image on the basis of the value of the degree-of-blur parameter of the recovery filter which has been highly evaluated. The highly evaluated recovery filter is regarded to have a degree-of-blur parameter that is most approximate to blurriness of the target image. On the basis of the determination result, the blur correction means sets a recovery filter on the basis of this degree-of-blur parameter and corrects the target image for blur.

According to another embodiment of the present invention, there is provided an image processing method for correcting an input image for blur using a recovery filter in accordance with blurriness of the image. The method includes receiving, with blurriness determining means, a target image to be corrected, applying to the target image a recovery filter including a degree-of-blur parameter corresponding to blurriness of the image while changing a value of the degree-of-blur parameter, evaluating a degree of recovery of each of corrected target images which have been corrected by using recovery filters having different values of the degree-of-blur parameter, and determining blurriness of the target image on the basis of the value of the degree-of-blur parameter of the recovery filter which has been highly evaluated; and setting, with blur correction means, a recovery filter for the target image on the basis of the degree-of-blur parameter in accordance with the determined blurriness of the target image and correcting the target image for blur using the recovery filter for the target image.

According to the image processing method, the blurriness determining means applies, to a target image to be corrected, a recovery filter while changing a value of its degree-of-blur parameter, evaluates a degree of recovery of each of corrected target images, and determines blurriness of the target image. Then, the blur correction means generates a recovery filter on the basis of the determined blurriness of the target image and corrects the target image for blur.

According to another embodiment of the present invention, there is provided an image capturing apparatus for performing processing of a captured image using a predetermined filter. The image capturing apparatus includes blurriness determining means for applying, when a target image to be corrected is selected, to the target image a recovery filter including a degree-of-blur parameter corresponding to blurriness of the image while changing a value of the degree-of-blur parameter, evaluating a degree of recovery of each of corrected target images which have been corrected by using recovery filters having different values of the degree-of-blur parameter, and determining blurriness of the target image on the basis of the value of the degree-of-blur parameter of the recovery filter which has been highly evaluated; and blur correction means for setting a recovery filter for the target image on the basis of the degree-of-blur parameter in accordance with the determined blurriness of the target image and correcting the target image for blur using the recovery filter for the target image.

According to the image capturing apparatus, a recovery filter generated by changing its degree-of-blur parameter is applied to a selected target image, and the corrected target image is evaluated, thereby determining blurriness of the target image. On the basis of the determination result, a recovery filter for the target image is generated, and the target image is corrected for blur using the generated recovery filter for the target image.

According to the embodiments of the present invention, when a target image to be corrected is specified, a recovery filter including a degree-of-blur parameter corresponding to blurriness of the image is applied to the target image while changing the degree-of-blur parameter, and the most appropriate degree-of-blur parameter is selected. The target image is corrected for blur using a recovery filter using the selected degree-of-blur parameter. Accordingly, blurriness of the target image is automatically determined, and the target image is corrected using the appropriate recovery filter. It is no longer necessary for a user to perform a complicated operation including adjustment of parameters. With a simple operation of specifying a target image, the target image can be corrected for blur.

BRIEF DESCRIPTION OF THE DRAWINGS

FIGS. 4A to 4C illustrate examples of a recovery filter generated with a certain degree of blur σ;

DESCRIPTION OF THE PREFERRED EMBODIMENTS

Figure 1:
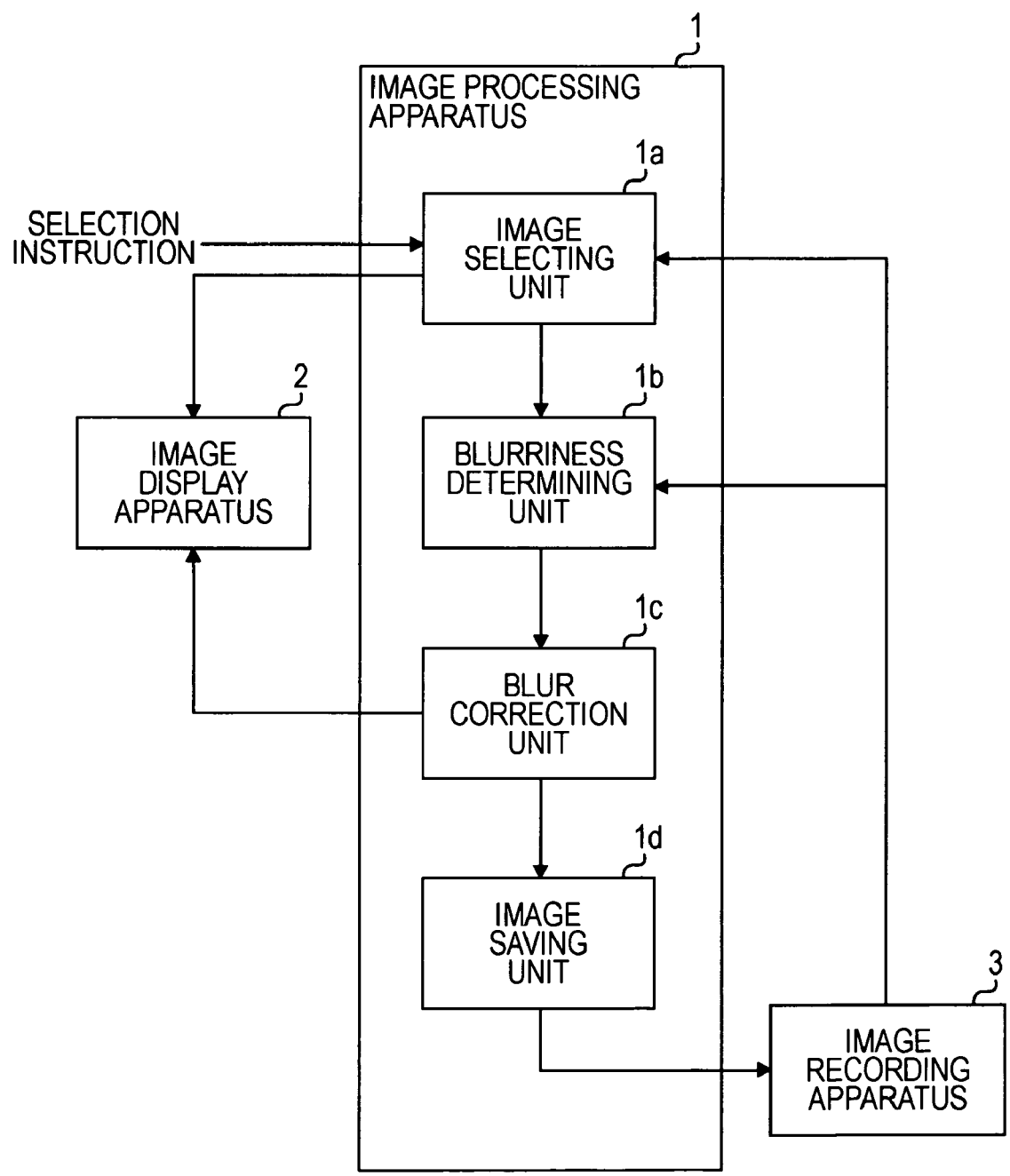
FIG. 1 is a conceptual diagram according to an embodiment of the present invention.

Hereinafter embodiments of the present invention will now be described with reference to the drawings. FIG. 1 is a conceptual diagram according to an embodiment of the present invention. An image processing apparatus 1 according to the embodiment of the present invention includes an image selecting unit 1a configured to select a target image to be corrected, a blurriness determining unit 1b configured to determine blurriness of the target image, a blur correction unit 1c configured to correct the target image for blur, and an image saving unit 1d configured to save the corrected image. An image display apparatus 2 configured to display an image and an image recording apparatus 3 configured to record image data are connected to the image processing apparatus 1. The image processing apparatus 1, the image display apparatus 2, and the image recording apparatus 3 may not necessarily be separate apparatuses and may be processing parts constituting one apparatus.

The image selecting unit 1a determines a target image to be corrected on the basis of an input user instruction entered through an operation input unit (not shown) or by automatically selecting an image that satisfies a predetermined criterion. On this occasion, if necessary, image data of the target image to be corrected is read, and the target image to be corrected is displayed on the image display apparatus 2.

The blurriness determining unit 1b determines blurriness of the image from a size-reduced image or a partial area of the image selected by the image selecting unit 1a to be corrected. Alternatively, the blurriness determining unit 1b may determine blurriness from the entire target image. To this end, a recovery filter for correcting the image for blur is generated using a predetermined point spread function. A point spread function is an output of a transform from an image corresponding to a point source input and generally used as a model of blur for transforming a vivid input to a blurry output. A point spread function, which is a model of image blur, includes a parameter corresponding to blurriness, which will be called a "degree-of blur parameter" hereinafter. Other spread functions include a line spread function and an edge spread function, which can be similarly used as models of image blur, as in a point spread function. A recovery filter for correcting an image for blur and recovering an image that includes almost no blur is generated on the basis of such a point spread function. Since the recovery filter, which will be described in detail later, is generated on the basis of the point spread filter, which is a model of blur, parameters of the recovery filter include a degree-of-blur parameter corresponding to blurriness. The recovery filter is generated as a spatial filter that can be directly applied to the target image. The blurriness determining unit 1b applies the recovery filter to the target image while changing the value of the degree-of-blur parameter and evaluates the degree of recovery of the target image. The degree of recovery quantitatively represents how much the target image has recovered from the blurry image and how sharp the target image has become with the use of the recovery filter. By comparing the degree of recovery corresponding to each of recovery filters, an optimal recovery filter for the target image can be selected. Blurriness of the target image is determined using the degree-of-blur parameter set in the recovery filter which has been highly evaluated. That is, it can be regarded that the highly evaluated recovery filter has a degree-of-blur parameter that is approximate to blurriness of the target image. Thus, when the optimal recovery filter is determined, blurriness of the target image can also be determined. The blur correction unit 1c is notified of the result of determining the blurriness. The notified determination result may be the value of the degree-of-blur parameter included in the selected recovery filter.

The blur correction unit 1c sets a recovery filter using the notified value of the degree-of-blur parameter or the value of the degree-of-blur parameter corresponding to the notified blurriness. The recovery filter is generated as a spatial filter to be applied to the entire target image. When the recovery filter is applied to the target image, a convolution operation is performed between the target image and the recovery filter, thus obtaining a corrected image which is appropriately corrected for blur.

Upon receipt of a recording instruction, the image saving unit 1d saves, in the image recording apparatus 3, the corrected image which is corrected for blur using the blur correction unit 1c. Alternatively, the corrected image may be automatically recorded in the image recording apparatus 3.

The image recording apparatus 3 is a storage unit configured to store image data of an image before being corrected or image data of an image after being corrected using the blur correction unit 1c.

The operation of the image processing apparatus 1 and an image processing method will be described. With a user operation, a target image to be corrected is selected, and an instruction to select the target image is input to the image processing apparatus 1. When the selection instruction is input, the image selecting unit 1a displays the selected image on the image display apparatus 2 if necessary and notifies the blurriness determining unit 1b of the target image. The blurriness determining unit 1b generates a predetermined recovery filter on the basis of a point spread function which is a model of image blur. The recovery filter generated in this manner includes a degree-of-blur parameter corresponding to the blurriness. By changing the degree-of-blur parameter included in the recovery filter, a plurality of recovery filters having different degree-of-blur parameter values are generated. These recovery filters are applied to the entire target image, a partial area of the target image, or a size-reduced image of the target image, thus correcting the target image for blur. The degree of recovery of each of corrected target images is evaluated, and blurriness of the target image is determined on the basis of the degree-of-blur parameter of the highly evaluated recovery filter. The blur correction unit 1c is notified of the determination result. On the basis of the degree-of-blur parameter determined for the target image, the blur correction unit 1c generates a recovery filter to be applied to the entire target image. The recovery filter is generated as a spatial filter that can be directly calculated with image data of the target image. The generated recovery filter is applied to the target image to correct the target image for blur, thus obtaining a corrected image. The generated corrected image may be displayed on the image display apparatus 2. When a recording instruction is input, the image saving unit 1d records the corrected image in the image recording apparatus 3.

As has been described above, when an instruction for specifying a target image is input to the image processing apparatus 1, a recovery filter based on a point spread function which is a model of blur is applied to the target image while changing a degree-of-blur parameter of the recovery filter, and blurriness of the target image is determined from the degree of recovery of the corrected target image. A recovery filter that best suits the determined blurriness is determined, and the target image is corrected for blur using the determined recovery filter. Therefore, it is not necessary for the user to perform complicated parameter adjustment; it is only necessary for the user to specify a target image to be corrected and give a correction instruction. Accordingly, the load on the user is alleviated, and user-friendliness is improved.

In the foregoing description, an image to be corrected for blur is arbitrarily selected by the user. Alternatively, reference information for determining whether blur correction is necessary may be provided to the user. For example, the blurriness determining unit 1b preliminarily calculates blurriness of a captured image. When the image is displayed on the image display apparatus 2, the blurriness of the image, which has been calculated in advance, is also indicated. Alternatively, an image whose calculated blurriness exceeds a predetermined criterion may be detected, and the user may be notified of the detected image. Accordingly, the user can objectively determine whether an image is necessary to be corrected for blur.

Now, recovery filters will be described. Recovery filters applied to deteriorated blurry images for recovery include, for example, a Wiener filter, a general inverse filter, and an irradiation filter. In this example, a Wiener filter is used as a recovery filter.

It is assumed that a blurry observation image which is a target image is g(x, y), a blur-free ideal image is f(x, y), a point spread function which is a model of blur is h(x, y), and noise is n(x, y). The relationship among them is:

$$g(x, y) = \int_{-\infty}^{\infty}\int_{-\infty}^{\infty} f(x-\xi, y-\eta)h(\xi, \eta)d\xi d\eta + n(x, y) \quad (1)$$

where x, y indicate a position of an image corresponding to two-dimensional coordinates. Both members of Equation (1) are Fourier-transformed using a convolution theorem:

$$G(u, v)=F(u, v)H(u, v)+N(u, v) \quad (2)$$

where G(u, v) is the result of a Fourier transform of the observation image g(x, y). Similarly, F(u, v) is the result of a Fourier transform of f(x, y); H(u, v) is the result of a Fourier transform of h(x, y); N(u, v) is the result of a Fourier transform of n(x, y). Here, H(u, v) is a transfer function for transforming the ideal image f(x, y) into the deteriorated observation image g(x, y). Further, when both members are divided by H(u, v), the following is obtained:

$$F(u, v) = \frac{G(u, v)}{H(u, v)} + \frac{N(u, v)}{H(u, v)} \quad (3)$$

It is now assumed that the recovered image is f'(x, y). Taking into consideration a recovery filter 1/Hw(u, v) for minimizing the error between the recovered image f'(x, y) and the ideal image f(x, y), the following is obtained:

$$\frac{1}{Hw(u, v)} = \frac{1}{H(u, v)} \frac{\|H(u, v)\|^2}{\|H(u, v)\|^2 + \Gamma} \quad (4)$$

where Γ is the energy density ratio of signal to noise and is approximated as an appropriate constant. See details for the foregoing recovery filter in, for example, Azriel Rosenfeld and Avinash C. Kak, *Digital Picture Processing* (New York: Academic Press, 1976), Translated by Makoto NAGAO, *Digital Gazo Shori*, 7.3 *Saisho Jijo Filter* (Kindai Kagakusha, 1978) p. 222-.

In order to recover an ideal image from a blurry image using such a recovery filter, since the recovery filter is a Fourier-transformed filter in the frequency domain, as indicated by Equation (4), the observation image g(x, y) is also Fourier-transformed into the frequency domain, and the recovery filter represented by Equation (4) is applied. Specifically, the following procedure is performed.

Firstly, the observation image g(x, y) is Fourier-transformed to compute G(u, v):

$$g(x, y) \to G(u, v) \qquad (5)$$

This is pre-processing for facilitating a correction operation using the recovery filter represented by Equation (4).

Secondly, the point spread function h(x, y) is Fourier-transformed to compute H(x, y). Further, using Equation (4), a recovery filter 1/Hw(u, v) is generated from H(u, v). Also, Γ is appropriately set in accordance with the image:

$$h(x, y) \to 1/Hw(u, v) \qquad (6)$$

Thirdly, the Fourier-transformed observation image G(x, y) is multiplied by the recovery filter 1/Hw(u, v) to obtain F^(u, v):

$$F^{\wedge}(u, v) = (1/Hw(u, v)) \times G(u, v) \qquad (7)$$

This is inverse-Fourier transformed to obtain a recovered image f^(x, y):

$$F^{\wedge}(u, v) \to f^{\wedge}(x, y) \qquad (8)$$

By performing the foregoing processing procedure, the observation image g(x, y) can be corrected for blur, and the recovered image f^(x, y) having minimum error relative to the ideal image can be obtained.

However, when the foregoing processing procedure is executed, it takes great time to perform a Fourier transform and an inverse Fourier transform of the observation image. Digital cameras have increasing number of effective pixels. Nowadays, digital cameras with 10 megapixels (3648×2736 pixels) or more are available. Since an image is represented by two-dimensional data, a Fourier transform and an inverse Fourier transform of the observation image and the recovered image involve a huge memory. A personal computer or an image processing apparatus, such as a desktop scanner or printer, can have a high-performance processor and a sufficient memory. However, it is difficult to provide a small-sized apparatus, such as a digital camera, with such a high-performance processor and a sufficient memory. Therefore, the inventor of the present invention has discovered an executable blur correction processing procedure which involves no Fourier transform or inverse Fourier transform of the observation image and the recovered image which have large amounts of data. Hereinafter, this processing procedure will be described.

Here, the recovery filter 1/Hw(u, v) is inverse-Fourier-transformed to obtain hw(x, y) in the frequency domain. Equation (7) is inverse-Fourier-transformed to obtain the following:

$$f^{\wedge}(x, y) = \int_{-\infty}^{\infty}\int_{-\infty}^{\infty} g(x-\xi, y-\eta) hw(\xi, \eta)\, d\xi\, d\eta \qquad (9)$$

When inverse-Fourier transformed, an imaginary part becomes zero, and only a real part remains. Since Equation (9) is in the form of convolution, Equation (9) is expressed using a convolution symbol *:

$$f^{\wedge}(x, y) = g(x, y) * hw(x, y) \qquad (10)$$

This is in the same form as that of a normal spatial filter. Therefore, a recovery process can be performed with a procedure similar to that in spatial filter processing. Hereinafter, a blur correction (image recovery) process using a recovery filter which has been transformed into a spatial filter will be described.

Figure 2:
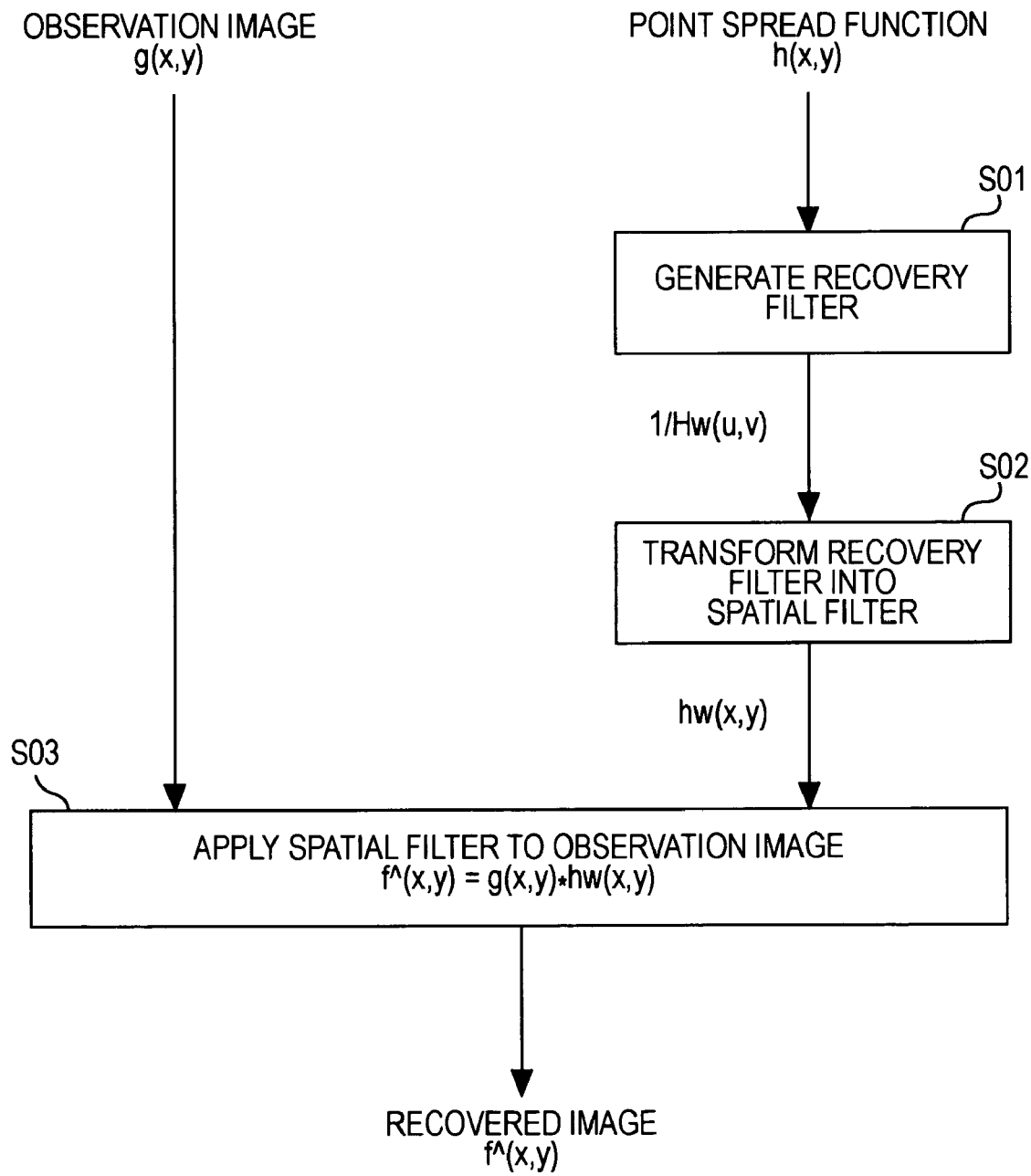
FIG. 2 is a chart showing a procedure of an image recovery process using a recovery filter which has been transformed into a spatial filter.

FIG. 2 is a chart showing a procedure of an image recovery process using a recovery filter which has been transformed into a spatial filter. In step S01, the point spread function h(x, y) which is a model of image blur is Fourier-transformed to obtain the recovery filter 1/Hw(u, v). Generation of the recovery filter is, as has been described, performed using H(u, v), which is obtained by performing a Fourier transform of the point spread function h(x, y), in Equation (4). Γ is appropriately set. This recovery filter 1/Hw(u, v) is a recovery filter in the frequency domain.

In step S02, the recovery filter 1/Hw(u, v) generated in step S01 is inverse-Fourier-transformed to obtain a spatial filter. The transformed recovery filter in the spatial domain is denoted by hw(x, y).

In step S03, the recovery filter hw(x, y) in the spatial domain is applied to the observation image g(x, y) to obtain the recovered image f^(x, y). The operation performed here is, as indicated by Equation (9), simply a convolution operation. Therefore, the operation can be processed as a repetition of a product-sum operation of constant coefficients. This involves a lighter operation load than that involved in a Fourier transform of the observation image and an inverse Fourier transform of the corrected image.

By performing the foregoing processing procedure, the recovery filter hw(x, y), which has been transformed into a spatial filter on the basis of the point spread function h(x, y), is generated, and the recovered image f^(x, y), which is the result of correcting the observation image g(x, y) for blur, is obtained. On this occasion, a Fourier transform for transforming the observation image g(x, y) into the frequency domain and an inverse Fourier transform for transforming the recovered image, which has been corrected in the frequency domain, into the recovered image f^(x, y) in the spatial domain are not performed. That is, the observation image g(x, y) is corrected for blur using the recovery filter which has been transformed into a spatial filter by performing a processing procedure similar to that in the case of a normal spatial filter.

Generation of a recovery filter in step S01 involves a Fourier transform, and transform of the recovery filter into a spatial filter in step S02 involves an inverse Fourier transform. However, the recovery filter is set to be significantly smaller than the observation image. Therefore, the load involved in performing the Fourier transform and the inverse Fourier transform is lighter.

In the foregoing description, generation of a recovery filter (step S01) and transform of the recovery filter into a spatial filter (step S02) are performed every time. Alternatively, recovery filters hw(x, y) in the spatial domain corresponding to a plurality of appropriate point spread functions h(x, y) may be obtained in advance.

Figure 3:
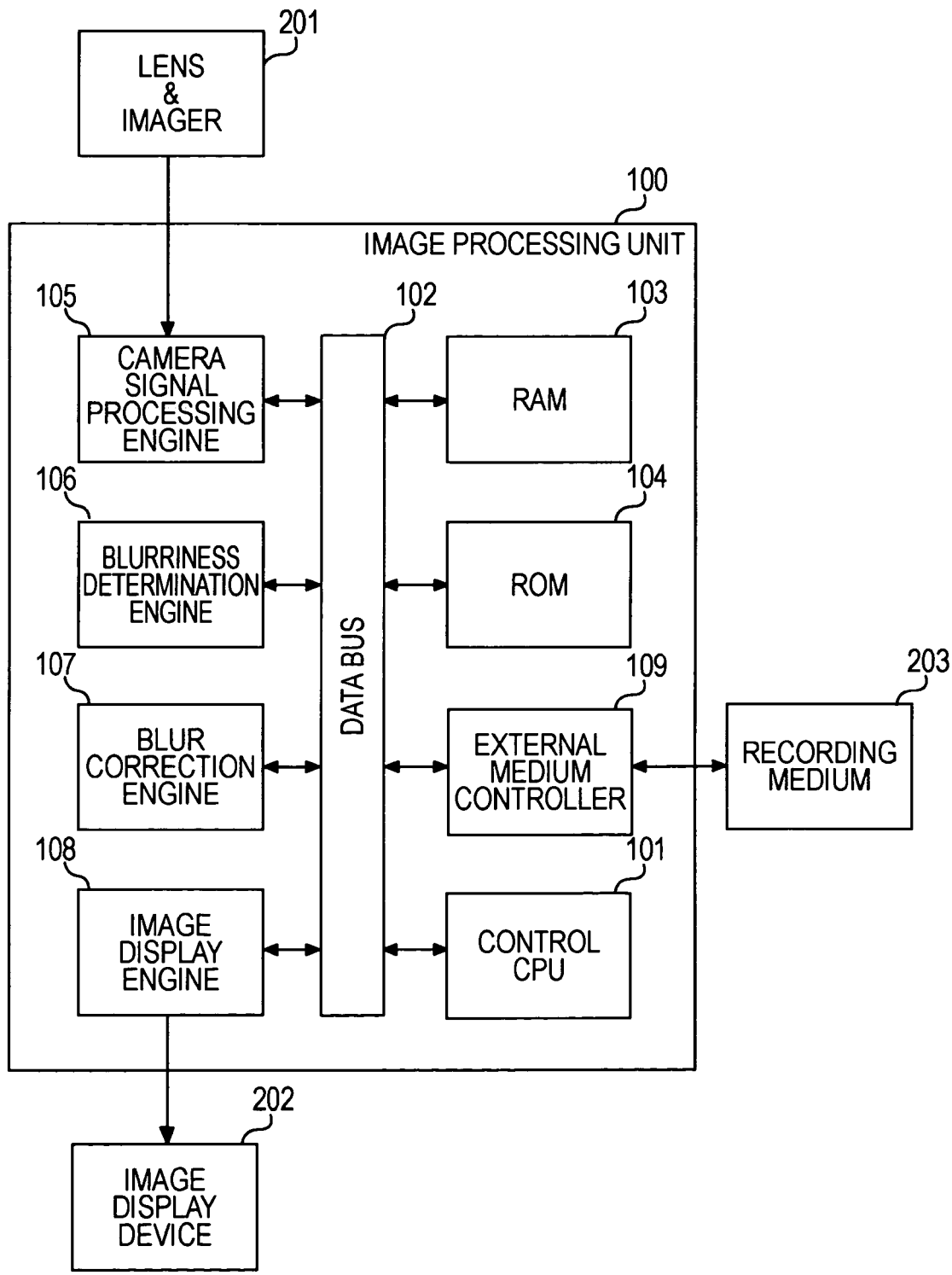
FIG. 3 is a block diagram of an image capturing apparatus according to the embodiment of the present invention.

Hereinafter, the embodiment will now be described in detail, with reference to the drawings, using the case in which the above-described blur correction process is applied to an image capturing apparatus by way of example. The target image capturing apparatus is a digital camera or the like which can apply processing to a captured image using a predetermined filter. FIG. 3 is a block diagram of the image capturing apparatus according to the embodiment of the present invention.

The image capturing apparatus includes an image processing unit 100 configured to perform processing of a captured image. A lens & imager 201 configured to capture an optical image of a subject, an image display device 202 configured to display an image, and a recording medium 203 configured to record image data and its related information are connected to the image processing unit 100.

The image processing unit 100 includes a control central processing unit (CPU) 101 configured to control the overall image processing unit 100. The control CPU 101 is connected via a data bus 102 to a random access memory (RAM) 103, a read-only memory (ROM) 104, a camera signal processing engine 105, a blurriness determination engine 106, a blur correction engine 107, an image display engine 108, and an external medium controller 109. An engine is a collective name for dedicated tools for solving predetermined problems and is constituted of hardware, software, or a combination of hardware and software.

The RAM 103 temporarily stores at least some of a program of an operating system (OS) and application programs to be executed by the control CPU 101. The RAM 103 stores various items of data necessary for processing performed with the control CPU 101. The ROM 104 stores OS and application programs. The camera signal processing engine 105 receives a camera signal obtained by the lens & imager 201, applies signal processing to the camera signal, and generates image data. Under control of the control CPU 101, the blurriness determination engine 106 selects a recovery filter that matches a target image while changing the degree of blur, thus determining blurriness of the target image to be corrected. The blur correction engine 107 generates a recovery filter on the basis of the blurriness of the image, which has been determined by the blurriness determination engine 106, and corrects the target image to be corrected. The image display engine 108 is connected to the image display device 202. In accordance with a command from the control CPU 101, the image display engine 108 displays an image on a screen of the image display device 202. In accordance with a command from the control CPU 101 or the like, the external medium controller 109 reads data from the recording medium 203, sends the data via the data bus 102, and writes specified data to the recording medium 203.

The lens & imager 201 is an image pickup unit configured to generate a camera signal. The lens & imager 201 includes a lens that brings in image light into the image capturing apparatus and an imager implemented by an image pickup element. Image light reflected from a subject (not shown) is input via a lens and radiated on an image pickup face of the imager. A camera signal captured by the imager is transferred to the camera signal processing engine 105. The image display device 202 displays a specified image on the screen. The recording medium 203 is a recording medium configured to record captured image data and its related information.

A blur correction process performed using the image capturing apparatus with the foregoing structure will now be described.

The point spread function and the recovery filter used in the blur correction process described below will now be described. In the embodiment, it is assumed that the point spread function representing a blur phenomenon is a two-dimensional Gaussian distribution. The two-dimensional Gaussian distribution is a normal distribution and is a function represented by:

$$h(x, y) = \frac{1}{2\pi\sigma^2}\exp\left(-\frac{x^2 + y^2}{2\sigma^2}\right) \quad (11)$$

where σ is a degree-of-blur parameter representing the dispersion of the distribution of strengths of blur. Hereinafter, the degree-of-blur parameter is regarded as the degree of blur σ. As is clear from Equation (11), the strength of blur is represented using only the degree of blur σ as a parameter. The larger the value of the degree of blur σ, the more the edges are blurred in the image. Besides the two-dimensional Gaussian distribution, a cylindrical distribution (light that is supposed to be captured at one point is evenly spreading in a cylindrical manner with a certain radius r) or the like can be used as the point spread function.

Regarding the recovery filter used in the image capturing apparatus, the two-dimensional Gaussian function represented by Equation (11) is Fourier transformed, and, using Equation (4), a recovery filter (Wiener filter) in the frequency domain is generated. Further, this filter is inverse-Fourier transformed to obtain a recovery filter in the spatial domain.

Specifically, a two-dimensional discrete Fourier transform of the point spread function, which is assumed to be the two-dimensional Gaussian distribution represented by Equation (11), is performed to generate a transfer function H(u, v):

$$H(u, v) = \frac{1}{\sqrt{MN}}\sum_{y=0}^{N}\sum_{x=0}^{M} h(x, y)\exp\left[-j2\pi\left(\frac{xu}{M} + \frac{yv}{N}\right)\right] \quad (12)$$

where M and N represent the size of the filter. The transfer function H(u, v) represented by Equation (12) is applied to Equation (4), thereby transforming it into a Wiener filter in the frequency domain. Further, a two-dimensional discrete inverse Fourier transform of the Wiener filter is performed to transform it into a recovery filter in the spatial domain. Accordingly, the recovery filter which has been transformed into a spatial filter is obtained:

$$hw(x, y) = \frac{1}{\sqrt{MN}}\sum_{v=0}^{N}\sum_{u=0}^{M} Hw(u, v)\exp\left[j2\pi\left(\frac{xu}{M} + \frac{yv}{N}\right)\right] \quad (13)$$

An example of such a recovery filter is described. FIGS. 4A to 4C illustrate examples of a recovery filter generated using a certain degree of blur σ. That is, FIG. 4A illustrates a Gaussian filter h(x, y) which contains ±3σ of the Gaussian distribution with a degree of blur σ=0.4. Similarly, FIG. 4B illustrates a Gaussian filter h(x, y) with a degree of blur σ=0.5.

FIG. 4C is a recovery filter hw(x, y) in the case where the degree of blur σ obtained by Equation (13) is 0.5. In this example, M=N=7.

By directly applying the recovery filter which has been generated in this manner to the observation image, an image corrected for blur can be obtained. The operation performed here is a repetition of a product-sum operation of constant coefficients and is similar to that generally performed with a spatial filter in an image capturing apparatus.

Hereinafter, a blur correction method performed with the image capturing apparatus according to the embodiment using the foregoing recovery filter will be described.

Figure 5:
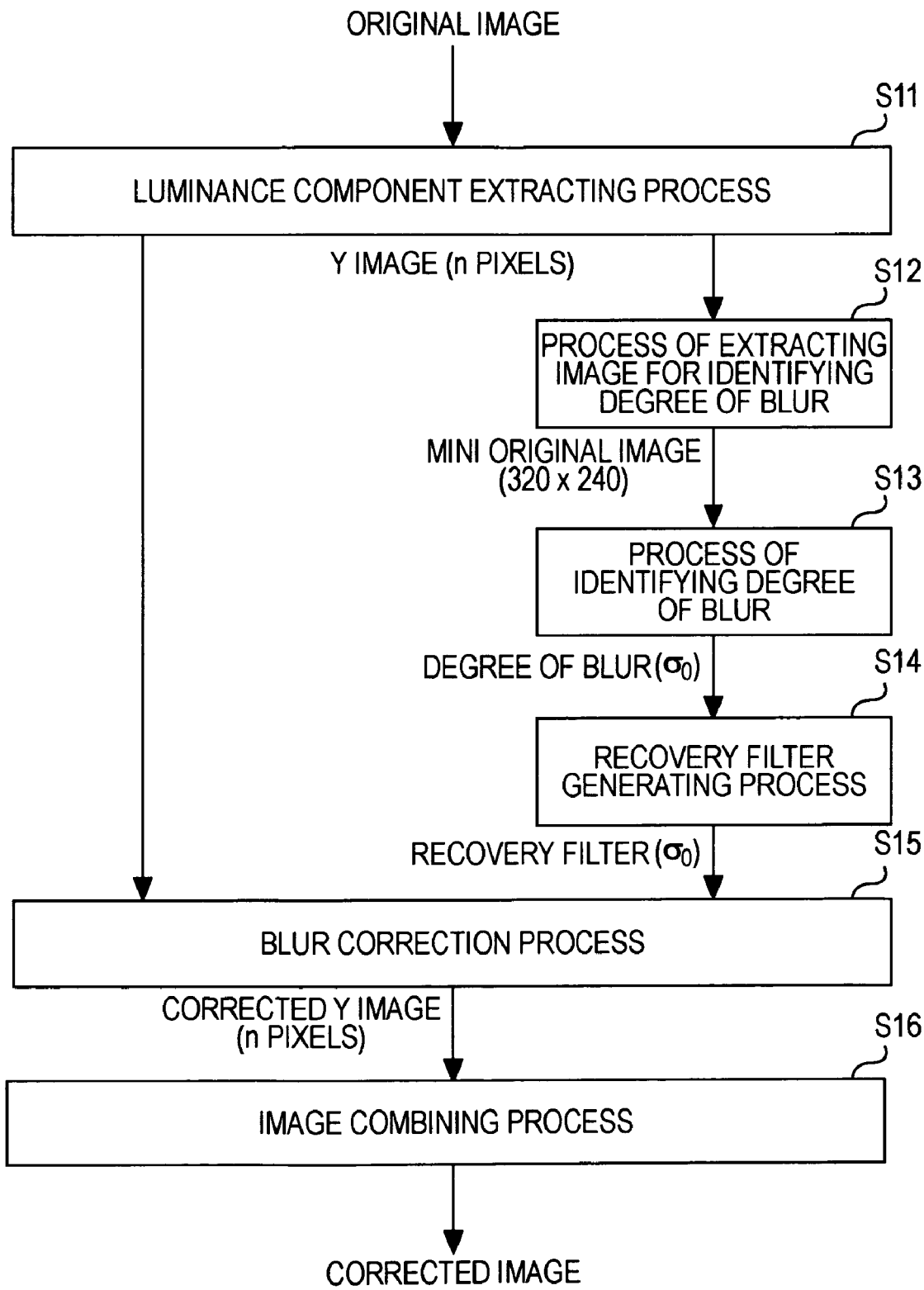
FIG. 5 is a chart showing an example of a blur correction process performed with the image capturing apparatus.

FIG. 5 is a chart showing an example of a blur correction process performed with the image capturing apparatus.

In step S11, when the blur correction process starts, a luminance component extracting process is performed. In the luminance component extracting process, original image data of a target image specified to be corrected (which has n pixels; n is an arbitrary integer) is read, and a luminance component is extracted from the read data. Hereinafter, an image generated by extracting a luminance component is called a Y image. Since the Y image is represented by data obtained by extracting the luminance component from the original image, the size of the Y image remains unchanged, that is, n pixels.

In step S12, a process of extracting an image for identifying the degree of blur is performed on the Y image. In this process of extracting an image for identifying the degree of blur, the Y image is reduced in size, or a partial area of the Y image is cut out to reduce the size of the Y image. Since the process of identifying the degree of blur is not intended to correct the original image for blur, this process may not necessarily be performed on the entire area of the image. Thus, an image area based on which the degree of blur can be identified is extracted. The extracted image is called a mini original image. In this example, the size of the mini original image is 320×240 pixels. Accordingly, the time taken by the process of identifying the degree of blur can be reduced.

In step S13, the process of identifying the degree of blur is performed using the mini original image, which is used for identifying the degree of blur and which is generated in step S12. In the process of identifying the degree of blur, the degree of blur a included in the recovery filter in the spatial domain, which is represented by Equation (13), is changed to generate a recovery filter corresponding to the mini original image (320×240 pixels). The generated recovery filter is made small according to the size of the mini original image. The generated recovery filter is applied to the mini original image, and the obtained corrected image is evaluated, thus determining the appropriate degree of blur σ. Hereinafter, the degree of blur σ set in each of the generated recovery filters is called the degree of blur $\sigma_i$ where i is an integer which corresponds to a corresponding one of the set parameter values and which ranges from 1 to all the number of parameters. The optimal degree of blur σ determined by evaluating the corrected images is particularly called the degree of blur $\sigma_0$.

In step S14, a recovery filter generating process is performed using the identified degree of blur $\sigma_0$. The recovery filter generating process generates a recovery filter used to correct the original image (n pixels) for blur (hereinafter called a recovery filter $\sigma_0$).

In step S15, the blur correction process is performed using the recovery filter $\sigma_0$ generated in step S14. The blur correction process applies the recovery filter $\sigma_0$ to the Y image (n pixels) to correct only the luminance component for blur, thus generating the corrected Y image (n pixels). This is because human eyes are sensitive to luminance, and, when a color component is corrected, a false color different from the original color may be generated. By omitting the correction of a color channel, the computational complexity can be reduced.

In step S16, an image combining process is performed using the corrected Y image (n pixels). The image combining process combines the corrected Y image, which is the luminance component corrected for blur using the recovery filter $\sigma_0$, and the color component of the original image to generate a corrected image.

By performing the foregoing processing procedure, the degree of blur in the specified original image is automatically determined, and, on the basis of the determination result, the image is corrected for blur using an optimal recovery filter.

Hereinafter, the details of the processes will be described in the following order: the process of generating an image for identifying the degree of blur, the process of identifying the degree of blur, and the process of correcting an original image for blur.

(a) Process of Generating Image for Identifying Degree of Blur

Figure 6:
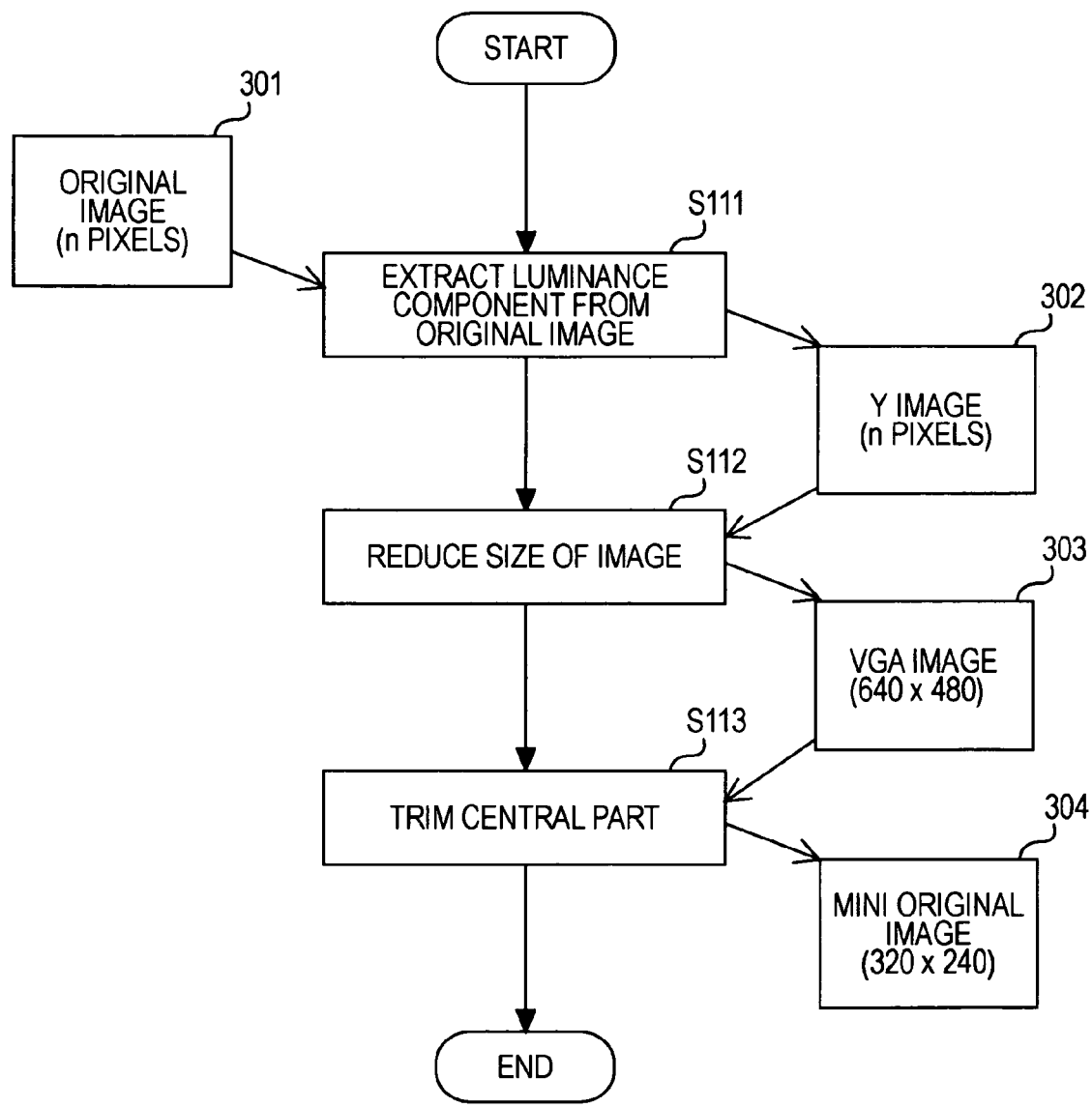
FIG. 6 is a flowchart showing a procedure of a process of generating an image for identifying the degree of blur.

The process of generating, from an original image specified to be corrected, a mini original image used in the process of identifying the degree of blur is performed. FIG. 6 is a flowchart showing a procedure of the process of generating an image for identifying the degree of blur.

In step S111, an original image (n pixels) 301 is read. A luminance component is extracted from the original image 301, thus generating a Y image (n pixels) 302. The original image 301 is an image to be corrected in which a blur phenomenon is occurring. At this point, the degree of blur σ of the original image 301 is unknown.

In step S112, the Y image (n pixels) 302 generated in step S111 is transformed to the Video Graphics Array (VGA) size (640×480 pixels). A generated VGA image (640×480 pixels) 303 is a size-reduced image of the original image (n pixels) 301. Transform of the Y image 302 into the VGA image 303 is performed with a function normally included in the image capturing apparatus, a detailed description of which is omitted.

In step S113, a central part of the VGA image (640×480 pixels) 303 of the original image 301, which is generated in step S112, is trimmed to generate a mini original image (320×240 pixels) 304. These sizes are only examples and are not limited thereto. The central part of the VGA image 303 is trimmed since the central part often contains major portions of the image. The area to be extracted may be adjusted on the basis of the image and additional information generated when the image was captured. If necessary, the range of extracting a mini original image may be set by the user. By extracting major portions of the image in this manner, the size of an image for identifying the degree of blur is further reduced.

By performing the foregoing processing procedure, an original image whose size is large (e.g., 10 megapixels) is reduced, and a partial area thereof is extracted to generate a mini original image (320×240 pixels). Alternatively, only one of the reduction of size and the extraction of a partial area may be performed. In the following process, since the process of identifying the degree of blur is performed using the miniature original image, the time taken by the process of identifying the degree of blur can be reduced, compared with the case in which the process of identifying the degree of blur is performed using the entire target image.

(b) Process of Identifying Degree of Blur

Figure 7:
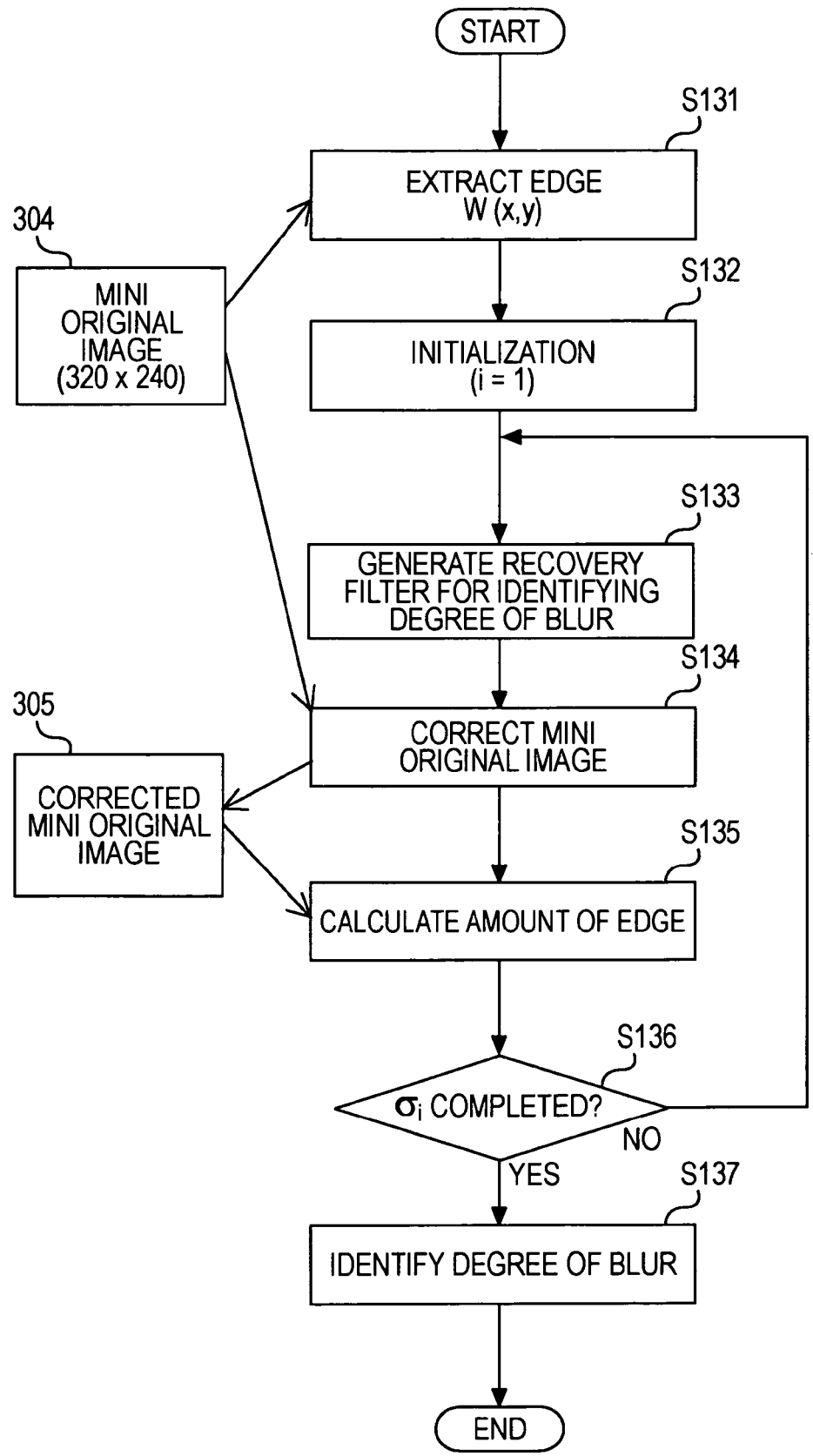
FIG. 7 is a flowchart showing a procedure of a degree-of-blur identifying process.

The process of applying recovery filters $\sigma_i$ with different degrees of blur $\sigma_i$ to the mini original image, evaluating the degrees of recovery of the corrected images, and hence determining the degree of blur $\sigma_0$ that matches the target image is performed. The amount of edge is used to evaluate the degree of recovery of an image. FIG. 7 is a flowchart showing a procedure of a degree-of-blur identifying process.

In step S131, the edge of the input mini original image 304 is extracted. The edge is a place in the image where one area ends and another area starts, that is, a place where a sudden luminance change occurs. For example, the strength of the edge of each pixel of the target mini original image 304 is extracted using an edge extraction filter based on the Roberts operator. The extracted strength of the edge of each pixel is denoted by W(x, y). The strength of the edge W(w, y) is temporarily saved in a storage unit.

In step S132, since a loop process is performed in subsequent steps S133 to S136 while changing the value of the degree-of-blur parameter, a pointer for specifying the degree-of-blur parameter is initialized (i=1). Accordingly, the degree of blur $\sigma_i$ is initialized to the degree of blur $\sigma_1$.

In step S133, a recovery filter for identifying the degree of blur is generated using the degree of blur $\sigma_i$. As has been described above, a two-dimensional discrete Fourier transform of a Gaussian filter with the degree of blur $\sigma_i$ is performed to obtain a Wiener filter in the frequency domain, and a two-dimensional discrete inverse Fourier transform of the Wiener filter is performed to obtain a recovery filter for identifying the degree of blur in the spatial domain. On this occasion, the size (M, N) of the recovery filter for identifying the degree of blur is reduced in accordance with the size of the target mini original image. For example, the size of the recovery filter is about 5×5 or 7×7. The generated recovery filter for identifying the degree of blur is called a recovery filter $\sigma_i$ for identifying the degree of blur in accordance with the degree of blur $\sigma_i$ included therein.

In step S134, the recovery filter $\sigma_i$ for identifying the degree of blur, which is generated in step S133, is applied to the mini original image 304, thus correcting the mini original image 304 for blur.

In step S135, the strength of the edge of each pixel of a corrected mini original image 305 which has been corrected using the recovery filter $\sigma_i$ for identifying the degree of blur is calculated. The calculation is performed using a method similar to that in step S131. The calculated edge is denoted by $D_i(x, y)$. Using the calculated edge $D_i(x, y)$ of the corrected image and the edge W(x, y) of the original image, which has been calculated in step S131, the amount of edge is calculated. The amount of edge E(i) is calculated by:

$$E(i) = \sum^{Entire\ Image} W(x, y)D_i(x, y) \quad (14)$$

The amount of edge E(i) is the amount representing how sharp the edge portion is. In general, a blurry image has an edge portion where the luminance, which is supposed to change sharply, changes smoothly due to a blur phenomenon. Therefore, when the image is appropriately corrected for blur, the edge portion of the original image becomes stronger. The calculated edge amount E(i) is temporarily saved in the storage unit.

In step S136, it is determined whether the processing of all the recovery filters with the degrees of blur $\sigma_i$ has been completed to calculate the amounts of edge. When the processing is not completed, the pointer is incremented by one. The flow returns to step S133, and the process is repeated. When the processing is completed, the flow proceeds to the next step.

Figure 8:
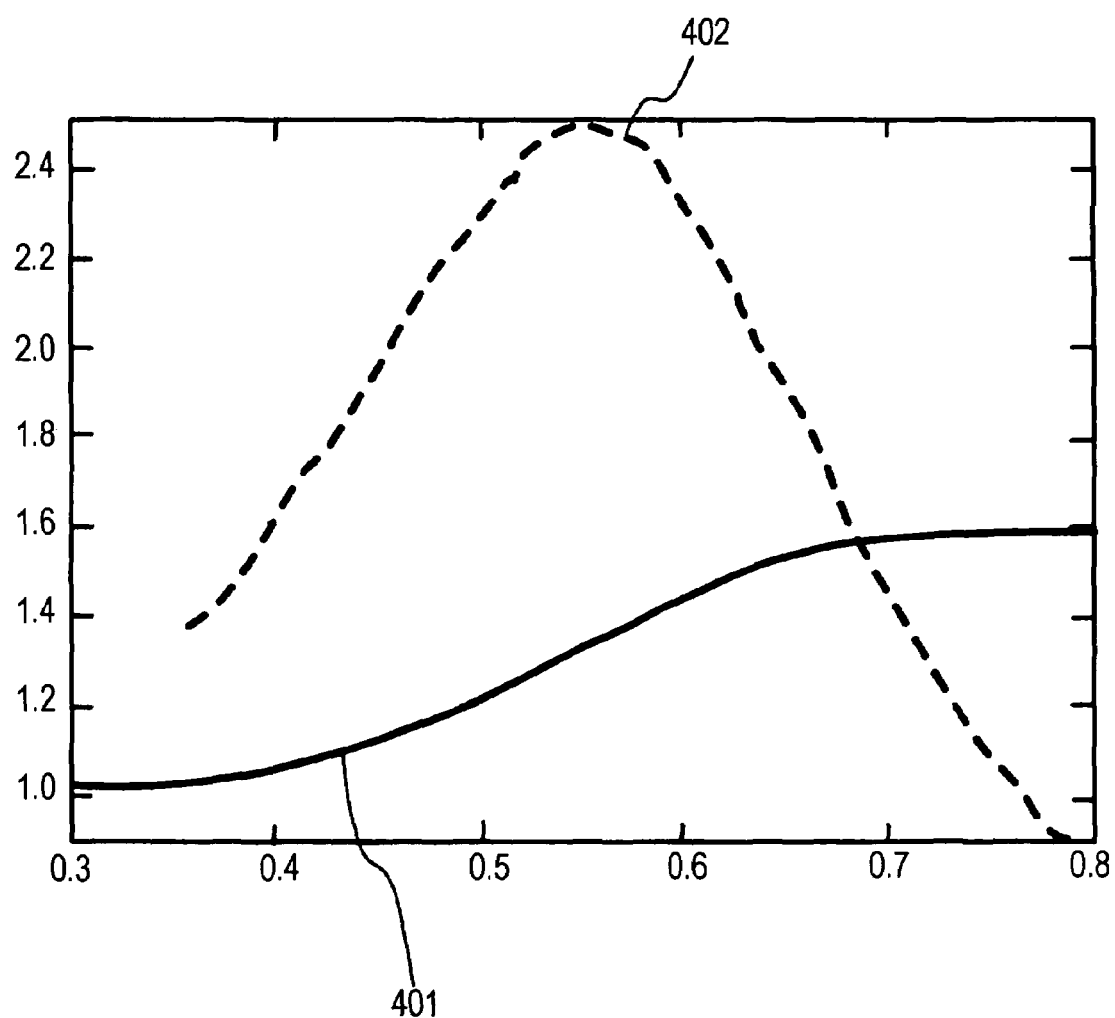
FIG. 8 is a graph showing the relationship between the degree of blur $\sigma_i$ and the amount of edge.

In step S137, since the amounts of edge E(i) have been calculated for all the degrees of blur $\sigma_i$, these amounts are evaluated, and the degree of blur $\sigma_0$ that is suitable for the mini original image 304 is identified. FIG. 8 is a graph showing the relationship between the degree of blur $\sigma_i$ and the amount of edge. The degree of blur $\sigma_i$ is plotted in abscissa, and the amount of edge E(i) is plotted in ordinate. Regarding the amount of edge, the amount of edge of the original image corresponds to 1.

An amount of edge E(i) 401 represents how sharp the edge portion is. When the degree of blur $\sigma$ is small, the amount of edge E(i) 401 is not different from that of the original image. However, the larger the degree of blur $\sigma$, the larger the amount of edge E(i) 401. FIG. 8 shows only one example. However, any image has a similar tendency. As has been described above, when the amount of edge of an image is small, that image is still blurry. However, an excessively sharp edge will results in linking noise, which is not appropriate. The most appropriate degree of blur $\sigma_0$ is in the vicinity of a portion where the change in the amount of edge is maximum. That is, the degree of blur $\sigma_i$ where $\Delta E(i)$ 402, which is the first order differential of the amount of edge E(i) 401, becomes maximum is the optimal degree of blur $\sigma_0$.

By performing the foregoing process, the optimal degree of blur $\sigma_0$ can be identified using the mini original image.

An example of a process of calculating the amount of edge will now be described.

It is assumed that the luminance of coordinates (x, y) of a blurry original image is g(x, y). It is also assumed that the edge W(x, y) at that position is:

$$W(x,y)=|g(x+1, y)-g(x,y)|+|g(x, y+1)-g(x,y)| \quad (15)$$

and the edge $D_i(x, y)$ of the image f^(x, y) corrected using the degree of blur $\sigma_i$ is:

$$D_i(x,y)=|f^(x+1, y)-f^(x,y)|+|f^(x, y+1)-f^(x,y)| \quad (16)$$

Then, the amount of edge E(i) of this corrected image is calculated as:

$$E(i) = \sum_{x=1}^{width} \sum_{y=1}^{height} W(x, y)D_i(x, y) \quad (17)$$

where width is the width of the image, and height is the height of the image.

Instead of equations (15) and (16) for calculating the edge of an image, the following equations may be used, respectively:

$$W(x,y)=\sqrt{(g(x+1,y)-g(x,y))^2+(g(x,y+1)-g(x,y))^2} \quad (18)$$

$$D_i(x,y)=\sqrt{(f^(x+1,y)-f^(x,y))^2+(f^(x,y+1)-f^(x,y))^2} \quad (19)$$

(c) Blur Correction Process

Figure 9:
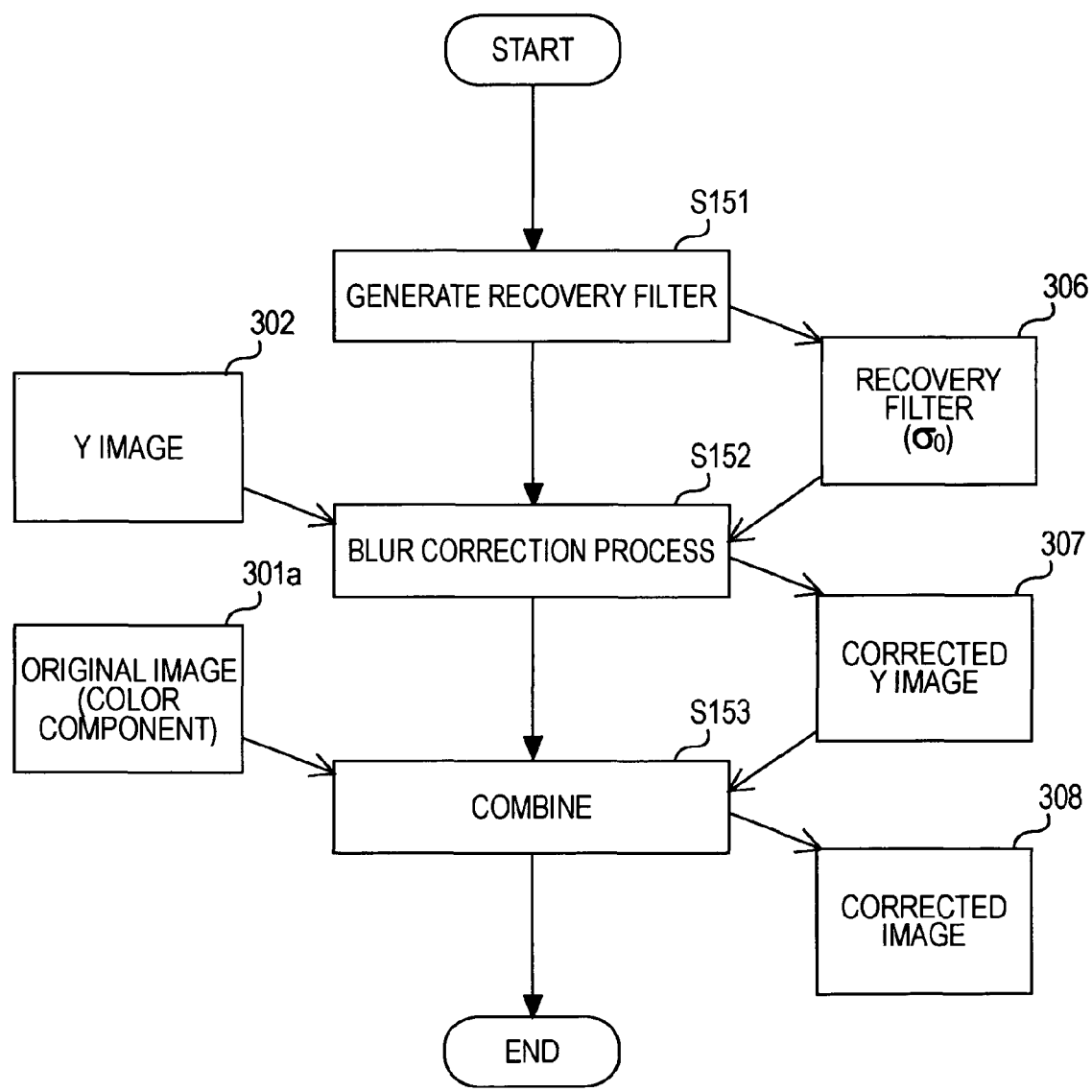
FIG. 9 is a flowchart showing a procedure of a blur correction process.

A process from the generation of a recovery filter to be applied to a target image to the generation of a corrected image obtained by performing a blur correction process on the target image is performed. FIG. 9 is a flowchart showing a procedure of a blur correction process.

In step S151, a recovery filter $\sigma_0$ to be applied to the target original image is generated using the identified degree of blur $\sigma_0$ of the mini original image 304. The recovery filter is generated with processing similar to that in the case where the recovery filter for identifying the degree of blur has been generated. On this occasion, when a mini image has been extracted by reducing the size of the original image, the value of the degree of blur $\sigma_0$ is changed in accordance with this size reduction ratio. For example, when the target image has a size of 3648×2736 pixels and a mini image is extracted from the target image by reducing the size of the target image to VGA (640×480 pixels), the value of $\sigma_0$ is multiplied by 5.7 times to generate a recovery filter.

In step S152, a blur correction process is performed on the Y image 302 obtained by extracting a luminance component from the target original image to correct the Y image 302 for blur using a recovery filter $\sigma_0$ 306 generated in step S151. The operation performed here is a simple filter processing operation. In this manner, a corrected Y image 307 is generated.

In step S153, a color component 301a of the original image 301 is combined with the corrected Y image 307 to generate a corrected image 308, which is then output.

By performing the foregoing processing procedure, the optimal recovery filter $\sigma_0$ is generated using the identified optimal degree of blur $\sigma_0$, and the target original image is corrected for blur.

The above-described image capturing apparatus can automatically correct a target original image for blur using a simple method without performing a Fourier transform of the target original image or an inverse Fourier transform of a corrected image.

In the foregoing description, a recovery filter for identifying the degree of blur is generated every time in the degree-of-blur identifying process. Alternatively, recovery filters hw(x, y) in the spatial domain corresponding to a plurality of point spread functions h(x, y) may be obtained in advance and stored in an internal storage unit. Accordingly, although a storage area for storing information is necessary to be reserved, arithmetic processing of recovery filters is unnecessary to perform. As a result, the processing time taken by the degree-of-blur identifying process can be reduced.

Although the case in which the foregoing image processing method is applied to the image capturing apparatus has been described in the present embodiment, the foregoing image processing method is applicable to a personal computer or another image processing apparatus.

The foregoing processing functions can be realized by using a computer. In that case, a program having written the processing content of the functions to be included in the image processing apparatus is provided. By executing the program on a computer, the foregoing processing functions are realized using the computer. The program having written the processing content can be recorded in a computer-readable recording medium. Computer-readable recording media include, but not limited to, a magnetic recording device, an optical disk, a magneto-optical recording medium, and a semiconductor memory. Magnetic recording devices include, but not limited to, a hard disk drive (HDD), a flexible disk (FD), and a magnetic tape. Optical disks include, but not limited to, a digital versatile disc (DVD), a DVD-RAM, a compact disc-ROM (CD-ROM), a CD-recordable (CD-R), and a CD-rewritable (CD-RW). Magneto-optical recording media include, but not limited to, magneto-optical (MO) disks.

Distribution of the program is performed by, for example, selling a portable recording medium, such as a DVD or a CD-ROM, having the program recorded thereon. Alternatively, the program may be stored in a storage device of a server computer, and the program can be transferred from the server computer to another computer via a network.

A computer that executes the program stores, for example, in a storage device thereof, the program recorded on the portable recording medium or the program transferred from the server computer. The computer reads the program from the storage device thereof and executes processing in accordance with the program. Alternatively, the computer may directly read the program from the portable recording medium and execute processing in accordance with the program. Furthermore, every time the program is transferred from the server computer to the computer, the computer can execute, as occasion arises, processing in accordance with the received program.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for correcting an input image for blur using a recovery filter in accordance with blurriness of the image, comprising:
    blurriness determining means for receiving a target image to be corrected, applying to the target image a recovery filter including a degree-of-blur parameter corresponding to blurriness of the image while changing a value of the degree-of-blur parameter, evaluating a degree of recovery of each of corrected target images which have been corrected by using recovery filters having different values of the degree-of-blur parameter, and determining blurriness of the target image on the basis of the value of the degree-of-blur parameter of the recovery filter which has been highly evaluated; and
    blur correction means for setting a recovery filter for the target image on the basis of the degree-of-blur parameter in accordance with the determined blurriness of the target image and correcting the target image for blur using the recovery filter for the target image,
    wherein the blurriness determining means calculates an amount of edge of the corrected target image on the basis of the strength of the edge of each pixel of the target image and the strength of the edge of each pixel of the corrected target image to which the recovery filter has been applied, and evaluates the degree of recovery of the corrected target image on the basis of the calculated amount of edge, and
    wherein the blurriness determining means detects one of the recovery filters in which the amount of edge changes most and determines the degree of blur of the target image on the basis of the value of the degree-of-blur parameter included in the detected recovery filter.

2. The image processing apparatus according to claim 1, wherein the blurriness determining means calculates a transfer function by performing a Fourier transform of a predetermined spread function which includes the degree-of-blur parameter and which is a model of blurriness of the image.

3. The image processing apparatus according to claim 2, wherein the blurriness determining means uses a two-dimensional Gaussian distribution as the spread function.

4. The image processing apparatus according to claim 1, wherein the blurriness determining means extracts a luminance component from the target image and determines blurriness of the target image using the target image including only the extracted luminance component, and
    wherein the blur correction means corrects the target image including only the extracted luminance component for blur.

5. The image processing apparatus according to claim 1, wherein the blurriness determining means generates a mini image by reducing a size of the target image, trimming a partial area of the target image, or reducing the size of the target image and trimming a partial area of the target image, and determines blurriness of the mini image.

6. An image processing method for correcting an input image for blur using a recovery filter in accordance with blurriness of the image, comprising:

receiving, with blurriness determining means, a target image to be corrected, applying to the target image a recovery filter including a degree-of-blur parameter corresponding to blurriness of the image while changing a value of the degree-of-blur parameter, evaluating a degree of recovery of each of corrected target images which have been corrected by using recovery filters having different values of the degree-of-blur parameter, and determining blurriness of the target image on the basis of the value of the degree-of-blur parameter of the recovery filter which has been highly evaluated; and setting, with blur correction means, a recovery filter for the target image on the basis of the degree-of-blur parameter in accordance with the determined blurriness of the target image and correcting the target image for blur using the recovery filter for the target image, wherein the blurriness determining means calculates an amount of edge of the corrected target image on the basis of the strength of the edge of each pixel of the target image and the strength of the edge of each pixel of the corrected target image to which the recovery filter has been applied, and evaluates the degree of recovery of the corrected target image on the basis of the calculated amount of edge, and wherein the blurriness determining means detects one of the recovery filters in which the amount of edge changes most and determines the degree of blur of the target image on the basis of the value of the degree-of-blur parameter included in the detected recovery filter.

7. A non-transitory computer readable storage medium having recorded thereon an image processing program for performing a process of correcting an input image for blur using a recovery filter in accordance with blurriness of the image, the program causing a computer to function as:

blurriness determining means for receiving a target image to be corrected, applying to the target image a recovery filter including a degree-of-blur parameter corresponding to blurriness of the image while changing a value of the degree-of-blur parameter, evaluating a degree of recovery of each of corrected target images which have been corrected by using recovery filters having different values of the degree-of-blur parameter, and determining blurriness of the target image on the basis of the value of the degree-of-blur parameter of the recovery filter which has been highly evaluated; and blur correction means for setting a recovery filter for the target image on the basis of the degree-of-blur parameter in accordance with the determined blurriness of the target image and correcting the target image for blur using the recovery filter for the target image, wherein the blurriness determining means calculates an amount of edge of the corrected target image on the basis of the strength of the edge of each pixel of the target image and the strength of the edge of each pixel of the corrected target image to which the recovery filter has been applied, and evaluates the degree of recovery of the corrected target image on the basis of the calculated amount of edge, and wherein the blurriness determining means detects one of the recovery filters in which the amount of edge changes most and determines the degree of blur of the target image on the basis of the value of the degree-of-blur parameter included in the detected recovery filter.

8. An image capturing apparatus for performing processing of a captured image using a predetermined filter, comprising:

blurriness determining means for applying, when a target image to be corrected is selected, to the target image a recovery filter including a degree-of-blur parameter corresponding to blurriness of the image while changing a value of the degree-of-blur parameter, evaluating a degree of recovery of each of corrected target images which have been corrected by using recovery filters having different values of the degree-of-blur parameter, and determining blurriness of the target image on the basis of the value of the degree-of-blur parameter of the recovery filter which has been highly evaluated; and blur correction means for setting a recovery filter for the target image on the basis of the degree-of-blur parameter in accordance with the determined blurriness of the target image and correcting the target image for blur using the recovery filter for the target image, wherein the blurriness determining means calculates an amount of edge of the corrected target image on the basis of the strength of the edge of each pixel of the target image and the strength of the edge of each pixel of the corrected target image to which the recovery filter has been applied, and evaluates the degree of recovery of the corrected target image on the basis of the calculated amount of edge, and wherein the blurriness determining means detects one of the recovery filters in which the amount of edge changes most and determines the degree of blur of the target image on the basis of the value of the degree-of-blur parameter included in the detected recovery filter.

9. An image processing apparatus for correcting an input image for blur using a recovery filter in accordance with blurriness of the image, comprising:

a blurriness determining unit to receive a target image to be corrected, apply to the target image a recovery filter including a degree-of-blur parameter corresponding to blurriness of the image while changing a value of the degree-of-blur parameter, evaluate a degree of recovery of each of corrected target images which have been corrected by using recovery filters having different values of the degree-of-blur parameter, and determine blurriness of the target image on the basis of the value of the degree-of-blur parameter of the recovery filter which has been highly evaluated; and a blur correction unit to set a recovery filter for the target image on the basis of the degree-of-blur parameter in accordance with the determined blurriness of the target image and correct the target image for blur using the recovery filter for the target image, wherein the blurriness determining unit calculates an amount of edge of the corrected target image on the basis of the strength of the edge of each pixel of the target image and the strength of the edge of each pixel of the corrected target image to which the recovery filter has been applied, and evaluates the degree of recovery of the corrected target image on the basis of the calculated amount of edge, and wherein the blurriness determining unit detects one of the recovery filters in which the amount of edge changes most and determines the degree of blur of the target image on the basis of the value of the degree-of-blur parameter included in the detected recovery filter.

10. An image capturing apparatus for performing processing of a captured image using a predetermined filter, comprising:

a blurriness determining unit to apply, when a target image to be corrected is selected, to the target image a recovery filter including a degree-of-blur parameter corresponding to blurriness of the image while changing a value of the degree-of-blur parameter, evaluate a degree of recovery of each of corrected target images which have been corrected by using recovery filters having different values of the degree-of-blur parameter, and determine blurriness of the target image on the basis of the value of the degree-of-blur parameter of the recovery filter which has been highly evaluated; and a blur correction unit to set a recovery filter for the target image on the basis of the degree-of-blur parameter in accordance with the determined blurriness of the target image and correct the target image for blur using the recovery filter for the target image, wherein the blurriness determining unit calculates an amount of edge of the corrected target image on the basis of the strength of the edge of each pixel of the target image and the strength of the edge of each pixel of the corrected target image to which the recovery filter has been applied, and evaluates the degree of recovery of the corrected target image on the basis of the calculated amount of edge, and wherein the blurriness determining unit detects one of the recovery filters in which the amount of edge changes most and determines the degree of blur of the target image on the basis of the value of the degree-of-blur parameter included in the detected recovery filter.

* * * * *